(12) United States Patent
Hundley et al.

(10) Patent No.: US 11,167,455 B1
(45) Date of Patent: Nov. 9, 2021

(54) DEVICE FOR IN-LINE CONSOLIDATION OF COMPOSITE MATERIALS

(71) Applicant: HRL LABORATORIES, LLC, Malibu, CA (US)

(72) Inventors: Jacob M. Hundley, Newbury Park, CA (US); Eric C. Clough, Santa Monica, CA (US); Zak C. Eckel, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 16/906,697

(22) Filed: Jun. 19, 2020

Related U.S. Application Data

(62) Division of application No. 15/143,237, filed on Apr. 29, 2016, now Pat. No. 10,737,411.

(60) Provisional application No. 62/155,988, filed on May 1, 2015.

(51) Int. Cl.
*B29C 35/08* (2006.01)
*B29K 101/10* (2006.01)

(52) U.S. Cl.
CPC ...... *B29C 35/0805* (2013.01); *B29K 2101/10* (2013.01)

(58) Field of Classification Search
CPC .......... B29C 35/0805; B29K 2101/10
See application file for complete search history.

(56) References Cited

U.S. PATENT DOCUMENTS

| 5,106,282 | A | * | 4/1992 | Sullivan, Sr. | ........... B29C 70/44 425/112 |
| 5,397,415 | A | | 3/1995 | Manabe | |
| 5,916,509 | A | | 6/1999 | Durhman | |
| 7,056,976 | B2 | | 6/2006 | Joshi et al. | |
| 8,511,362 | B2 | | 8/2013 | Walczyk et al. | |
| 2007/0286955 | A1 | * | 12/2007 | Kondo | .................. B29C 70/545 427/249.2 |

(Continued)

FOREIGN PATENT DOCUMENTS

| EP | 0313155 A1 * | 4/1989 | ........... B29C 70/545 |
| JP | 5960610 B2 * | 8/2016 | ............. B29C 33/06 |

OTHER PUBLICATIONS

Endruweit, A. et al., "Curing of Composite Components by Ultraviolet Radiation: A Review", Polymer Composites, 2006, pp. 119-128, Society of Plastics Engineers.

(Continued)

*Primary Examiner* — Yung-Sheng M Tsui
*Assistant Examiner* — Melody Tsui
(74) *Attorney, Agent, or Firm* — Lewis Roca Rothgerber Christie, LLP

(57) ABSTRACT

A system for fabricating composite parts efficiently. Preimpregnated (prepreg) composite material is drawn as a sheet from a roll and fed by advancement rollers into a stamping and molding station in which a piece of the prepreg material is cut, on a mold, from the sheet. Pressure is applied to cause the prepreg material to conform to a surface of the mold, and the prepreg is cured with ultraviolet light. Additional layers of prepreg may be cut and cured on any layers that have already been cured on the mold. The complete part may be removed from the mold with ejector pins. Scrap prepreg may be recycled in a recycling station that separates reinforcing fiber from uncured resin.

18 Claims, 15 Drawing Sheets

(56) References Cited

U.S. PATENT DOCUMENTS

| | | | |
|---|---|---|---|
| 2010/0181018 A1* | 7/2010 | Walczyk | B29C 70/44 |
| | | | 156/243 |
| 2010/0260941 A1* | 10/2010 | Bushmire | C08J 7/123 |
| | | | 427/515 |
| 2012/0115975 A1 | 5/2012 | Kania et al. | |
| 2012/0121848 A1* | 5/2012 | Gold | B32B 5/26 |
| | | | 428/76 |
| 2013/0165585 A1 | 6/2013 | Tadepalli | |
| 2013/0295806 A1 | 11/2013 | Imai | |
| 2013/0307191 A1 | 11/2013 | Polk, Jr. | |
| 2016/0009001 A1 | 1/2016 | Moore | |
| 2016/0046086 A1* | 2/2016 | Wenzel | B29C 51/082 |
| | | | 264/163 |

OTHER PUBLICATIONS

Shaw, Jonathan, "Advantages of UV Curing in Composite Manufacturing", Cytec Coating Resins, Feb. 26, 2013, 25 pages.

Website: "JEC Europe 2012 report", Composites World, http://www.compositesworld.com/articles/jec-europe-2012-report, printed Dec. 16, 2016, 6 pages.

Website: "Prepreg Machinery", http://www.calitzler.com/prepred-machinery, printed Dec. 15, 2016, 1 page, C.A. Litzler Co., Inc., Cleveland, Ohio, USA.

* cited by examiner

DEVICE FOR IN-LINE CONSOLIDATION OF COMPOSITE MATERIALS

CROSS-REFERENCE TO RELATED APPLICATION(S)

The present application is a divisional of U.S. patent application Ser. No. 15/143,237, filed Apr. 29, 2016, which claims priority to and the benefit of U.S. Provisional Application No. 62/155,988, filed May 1, 2015, entitled "DEVICE FOR IN-LINE CONSOLIDATION OF COMPOSITE MATERIALS", the entire content of each of which is incorporated herein by reference.

FIELD

One or more aspects of embodiments according to the present invention relate to fabrication of composite parts, and more particularly to a system and method for fabricating composite parts efficiently.

BACKGROUND

Composite parts are used in a wide variety of applications, including components of vehicles, watercraft, and aircraft. Related art continuous flow processes may be limited to forming prismatic parts. Related art batch processes may require manual and individual placement of plies into a mold assembly, and thermal curing in a mold assembly; these processes may be slow as a result.

Thus, there is a need for an efficient system for fabricating composite parts.

SUMMARY

Aspects of embodiments of the present disclosure are directed toward a system for fabricating composite parts efficiently. Pre-impregnated (prepreg) composite material is drawn as a sheet from a roll and fed by advancement rollers into a stamping and molding station in which a piece of the prepreg material is cut, on a mold, from the sheet. Pressure is applied to cause the prepreg material to conform to a surface of the mold, and the prepreg is cured with ultraviolet light from an ultraviolet source. Additional layers of prepreg may be cut and cured on any layers that have already been cured on the mold. The complete part may be removed from the mold with ejector pins. Scrap prepreg may be recycled in a recycling station that separates reinforcing fiber from uncured resin.

In one embodiment, the ultraviolet light source is configured to emit light at a wavelength between 280 and 315 nm. In one embodiment, the ultraviolet light source is configured to emit light at a wavelength between 315 and 430 nm. In one embodiment, the ultraviolet light source is enclosed by a shield, opaque to ultraviolet light.

According to an embodiment of the present invention there is provided a system for consolidation of pre-impregnated thermosetting polymer matrix composite material (prepreg), the system including: a first mold having a molding surface; a plurality of rollers configured to position the prepreg for molding by the first mold; cutting device configured to cut a piece of the prepreg on the first mold; and a source of energy configured to consolidate the prepreg.

In one embodiment, the plurality of rollers is further configured to maintain tension on the prepreg.

In one embodiment, the system includes a mold assembly including the first mold and a second mold configured to mate with the first mold.

In one embodiment, the system includes a compaction device configured to press the first mold and the second mold against each other, wherein the compaction device is a device selected from the group consisting of hydraulic presses, pneumatic presses, screw-driven presses, electric presses, and combinations thereof.

In one embodiment, the system includes means for pressing the piece of the prepreg to the molding surface, wherein the means is selected from the group consisting of: gravity, vacuum chucks, a second mold configured to mate with the first mold and a compaction device configured to press the first mold and the second mold against each other, and combinations thereof.

In one embodiment, the source of energy is an ultraviolet light source.

In one embodiment, the system includes a base configured to support the mold, the base being capable of translation in three dimensions and rotation about an axis parallel to the first direction.

In one embodiment, the cutting device is a device selected from the group consisting of shears, lasers, and combinations thereof.

In one embodiment, the ultraviolet light source is configured to emit light at a wavelength between 100 and 280 nm.

In one embodiment, the system includes a pre-impregnated thermosetting polymer matrix composite material including a matrix material and a reinforcing material.

In one embodiment, the matrix material includes, as a major component, an ultraviolet-curable thermosetting polymer selected from the group consisting of thiols, -enes, acrylates, methacrylates, urethanes, epoxies, polyesters, vinyl esters, and combinations thereof.

In one embodiment, the matrix material includes, as a major component, a thermally-curable thermosetting polymer matrix.

In one embodiment, the system includes, as a major component, a material selected from the group consisting of carbon, aramid, glass, ultra-high molecular weight polyethylene, alumina, silicon carbide, boron and combinations thereof.

In one embodiment, the reinforcing material includes, as a major component, continuous fibers, that are unidirectional, woven, braided or knitted.

In one embodiment, the reinforcing material includes, as a major component, a discontinuous mat of fibers.

In one embodiment, the source of energy is a thermal energy source selected from the group consisting of infrared heaters, resistive heaters, induction heaters, heated molds, and combinations thereof.

In one embodiment, the first mold includes a plurality of ejector pins.

In one embodiment, the system includes a clamping system configured to maintain tension on the prepreg while the prepreg is cut by the cutting device.

In one embodiment, the first mold is partially transparent to ultraviolet light or contains an ultraviolet-transparent aperture.

In one embodiment, the system includes a flexible membrane drawn over the first mold, wherein the volume between the first mold and the membrane is at least partially evacuated.

In one embodiment, the membrane is transparent to ultraviolet light.

In one embodiment, the system includes a device for separating un-consolidated thermosetting polymer resin from reinforcing fiber, the device including: a plurality of heating elements; a plurality of forced air devices; a container for collecting un-consolidated thermosetting polymer resin; and a plurality of rollers configured to maintain tension on a material composed of thermosetting polymer resin and reinforcing fiber, wherein the heating element is an element selected from the group consisting of infrared heaters, resistive heaters, and combinations thereof.

In one embodiment, the system includes a chopper to chop dry fiber reinforcement separated from resin into discontinuous fiber strands.

In one embodiment, the device is configured to utilize natural convection, forced air, electrically charged plates, or at least partial vacuum to collect dry chopped fibers.

In one embodiment, the system includes: a first device configured to impregnate initially dry fiber reinforcement with a thermosetting polymer resin, the first device including: a control system configured to maintain tension on a plurality of fibers; a plurality of spacing devices configured to control a fiber areal weight; a metering device configured to control a volume of a polymer resin applied to the plurality of fibers; and a plurality of rollers configured to apply the polymer resin to the fibers; and a second device configured to compact fiber and resin constituents into a continuous pre-impregnated composite material, the second device including: a control system configured to maintaining tension on the pre-impregnated composite material; a plurality of compaction rollers configured to control the thickness of the pre-impregnated composite material; and a plurality of heating plates configured to control a temperature of the pre-impregnated composite material.

In one embodiment, the first device is configured to utilize a material selected from the group consisting of polymer resins in films, polymer resins in a solid form, polymer resins in a liquid form, unidirectional non-woven fiber reinforcements, fiber reinforcements stored in a series of creels, continuous knit fiber reinforcements, braided fiber reinforcements, woven fiber reinforcements, discontinuous chopped mat fiber reinforcements, binders, and combinations thereof.

According to an embodiment of the present invention there is provided a method for fabricating a composite part, the method including: positioning a sheet of pre-impregnated thermosetting polymer matrix composite material (prepreg) for molding by a mold; cutting a piece of prepreg from the sheet, the cutting being performed on the mold; applying pressure to the piece of prepreg, the pressure being sufficient to cause the piece of prepreg to conform to a surface of the mold; and partially or fully curing the piece of prepreg.

BRIEF DESCRIPTION OF THE DRAWINGS

These and other features and advantages of the present invention will be appreciated and understood with reference to the specification, claims and appended drawings wherein:

DETAILED DESCRIPTION

The detailed description set forth below in connection with the appended drawings is intended as a description of exemplary embodiments of a device for in-line consolidation of composite materials provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
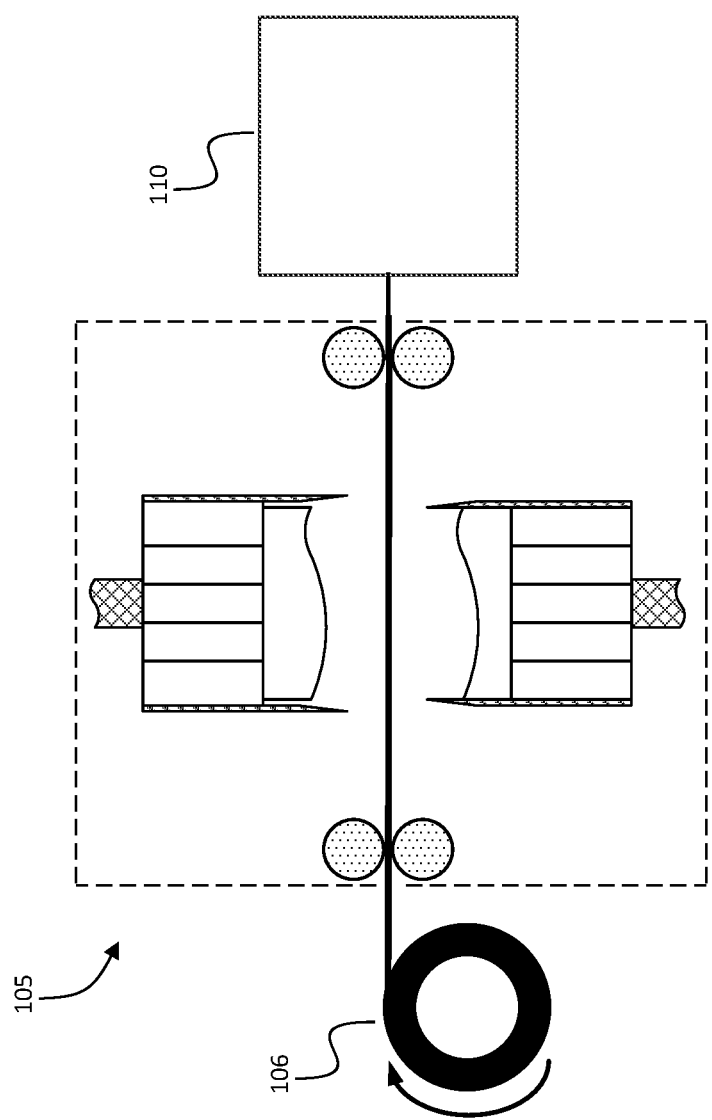
FIG. 1 is a block diagram of a device for in-line consolidation of composite materials, according to an embodiment of the present invention.

Referring to FIG. 1, in one embodiment, the in-line composite consolidation device includes a stamping and molding station 105, in which pre-impregnated (prepreg) composite material is drawn from a roll 106 into a molding apparatus which cures the part into its final shape. In the stamping and molding station 105, prepreg is cut to a specific size, compacted within an open or closed mold assembly, and subsequently exposed to an energy source which initiates cross-linking in the resin. This process may be repeated, with one or more additional plies being added with each repetition, until the desired thickness of the composite part is achieved. The process may include rotation and/or translation of the part before each additional ply is added, which may change the orientation of one or more adjacent plies. The part can then be ejected from the mold assembly.

The in-line composite consolidation device further includes a recycling station 110, following the stamping and molding station 105, that reduces the unused prepreg materials back to the individual constituent phases (separate fiber and matrix). In another embodiment, the recycling station is not included and unused prepreg materials are discarded after formation of the part. Both the stamping and molding station 105 and the recycling station 110 may be included within a single device as shown in FIG. 1, which may enable the device to produce finished composite parts with arbitrary cross-sections and curvature from raw material stock (fiber and matrix resin), and which may reduce the cycle time in the manufacturing process, compared to related art processes.

Figure 2:
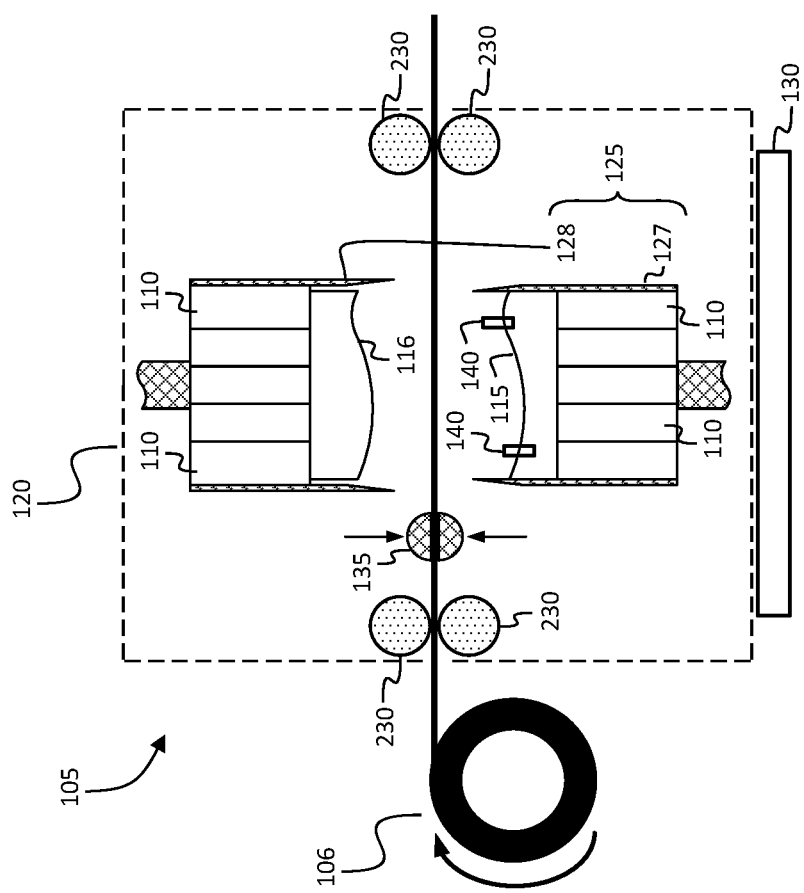
FIG. 2 is a schematic diagram of a stamping and molding station fed by a roll of prepreg, according to an embodiment of the present invention.

Referring to FIG. 2, in one embodiment, the first component of the device is the stamping and molding station 105. The stamping and molding station 105 serves to cut, lay up, mold and cure a plurality of prepreg plies into a finished composite part. The stamping and molding station 105 may include one or more ultraviolet (UV) sources 110 which provide the input energy necessary to consolidate (i.e., cure) the part (such as light-emitting diodes (LEDs) or mercury (Hg) arc lamps), one or more UV-transparent molds, e.g., a lower mold 115 and an upper mold 116, defining the shape of the composite part, and a shield 120 to prevent exposure of the liquid resin and prepreg outside of the area of the mold assembly to UV light. The stamping and molding station 105 may further include a shear 125, having a lower blade 127 and an upper blade 128, to cut the ply in the correct geometry prior to molding. The lower and upper blades 127, 128 may be attached to the lower and upper molds 115, 116, respectively, forming an assembly referred to herein as a shear-mold assembly. The lower blade may protrude about 10 mm above the edge of the lower mold. As the shear-mold assembly is closed, the shear blades 127, 128 initially cut the prepreg, and then as the shear-mold assembly is closed completely, the molds form the ply or plies into a shape conforming to the surfaces of the molds. As used herein, the term "mold" refers to a part having a surface (or "molding surface") configured to shape a ply (or several plies) of prepreg when the prepreg is pressed against the surface. A mold assembly, as used herein, is an assembly that performs a molding function. A mold assembly may include a single mold, or it may include lower and upper molds 115, 116, for example, or it may include more than two molds. The mold or set of molds in the mold assembly may be referred to as the mold portion of the mold assembly. The mold assembly may also include one or more additional mechanisms or systems for performing the molding function, such as actuators, e.g., hydraulic, electric, or pneumatic actuators, for example for bringing together, or separating, lower and upper molds 115, 116, or one or more vacuum chucks for holding a piece of prepreg to the surface of a mold. The mold portion may consist of only a lower mold, for example if gravity is used to press the prepreg against a molding surface of the lower mold, or it may consist of a single mold in any orientation if, for example, a vacuum chuck is used so that atmospheric pressure presses the prepreg against the molding surface of the mold.

The prepreg may be cut in place in the mold assembly, e.g., by a shear secured to the mold assembly as described above, or by another cutting device such as a laser cutter that cuts the prepreg after it is (i) draped over a mold of the mold assembly, or (ii) held (e.g., by tension) directly above, and separated by a small gap from, a mold, so that when the section of prepreg is cut, it falls onto or drapes over the mold (or, if the mold includes a vacuum chuck, is pressed against the mold, by atmospheric pressure). As such, the prepreg may be molded without being moved from a cutting station to a separate molding station. As used herein, a cutting device is referred to as cutting prepreg "on" a mold when at the completion of the cut, the cut piece of prepreg is in position for molding, without requiring a separate operation to place the cut piece of prepreg in a mold assembly or on a mold.

The molds 115, 116 or the entire assembly within, or including, the shield, may be supported on a rotating mold base 130 that may be rotated to define the angle of the mold assembly with respect to the prepreg, thus controlling the orientation of the ply in the composite layup during molding. For example, adjacent plies may have a difference in orientation between 0° and 180°. A vacuum chuck may be part of the upper mold 116 or the lower mold 115 to fix the cured composite part onto the surface of the mold. A plurality of advancement rollers 230 may be employed to maintain tension on the prepreg material.

A clamping system including a clamp 135 (or a plurality of clamps) may be used to maintain tension as individual plies are cut. The clamp 135 may be movable (e.g., on a track) parallel to the direction of advancement of the prepreg, and may be used to advance the prepreg to the next set of rollers after consolidation, as discussed in further detail below. Ejector pins 140 in a mold may be used to remove the finished composite part from the mold after all plies have been laid up and cured.

Figure 3A:
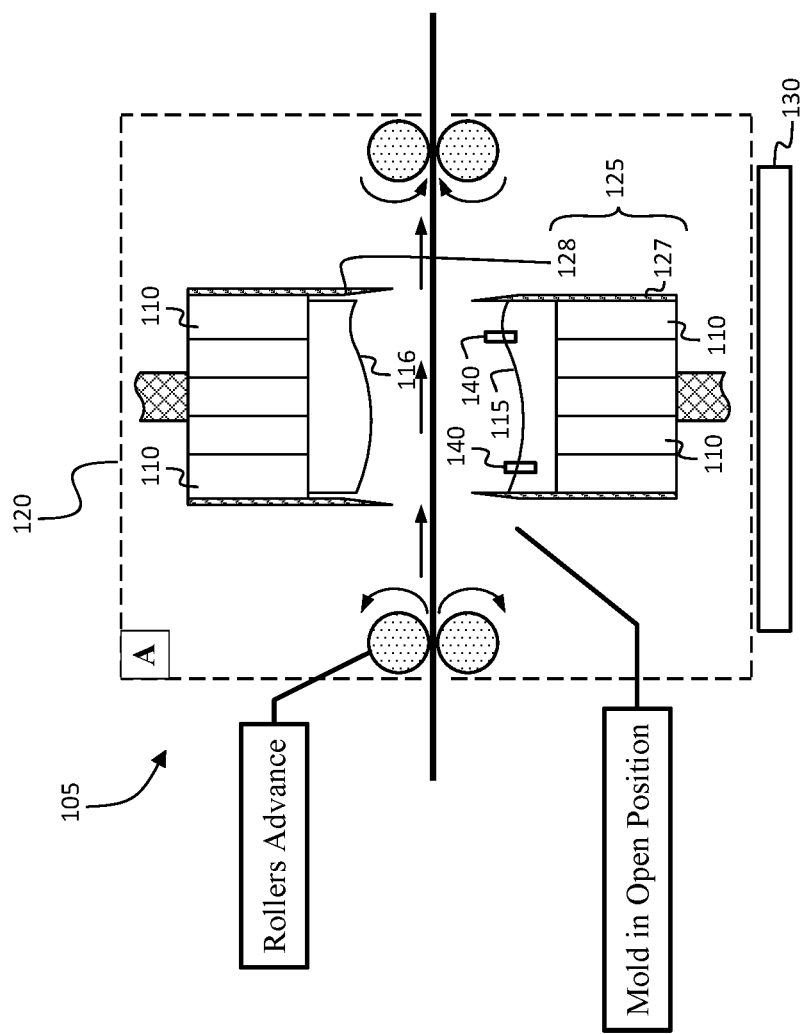
FIG. 3A is a schematic diagram of a first phase of a stamping and molding method, according to an embodiment of the present invention.

FIGS. 3A-3F show an approach for consolidation of one or more composite plies using the stamping and molding station 105. First, prepreg material coming into the station is drawn over the UV-transparent mold (FIG. 3A). A UV-transparent mold may be composed, for example, of poly (methyl methacrylate) (PMMA). The prepreg may either be from a roll of material, or, in one embodiment described in further detail below, as output from a compaction station. The prepreg used in the stamping and molding station 105 includes (e.g., consists of, comprises) a continuous or discontinuous reinforcing fiber (e.g. carbon, aramid, glass, ultra-high molecular weight polyethylene, alumina, silicon carbide, or boron) and a UV-curable resin (e.g., a free radical resin or a cationic cure resin). Examples of resin systems which may be used in this device include thiols, -enes, acrylates, methacrylates, urethanes, epoxies, vinyl esters or any combination thereof. This prepreg material may have a continuous length (e.g., any length that can be accommodated on a roll) and a width much larger than its thickness. The width may be between 12" and 52", and the thickness may be between 0.004" and 0.020"). In another embodiment, the prepreg material may be fully or partially composed of a thermally-curable resin in which cross-linking occurs at elevated temperatures (e.g., 120° F.-350° F.). In this embodiment, the UV sources may be replaced with a source of thermal energy such as an infrared heater, resistive heater, induction heater or heated mold assembly.

Figure 3B:
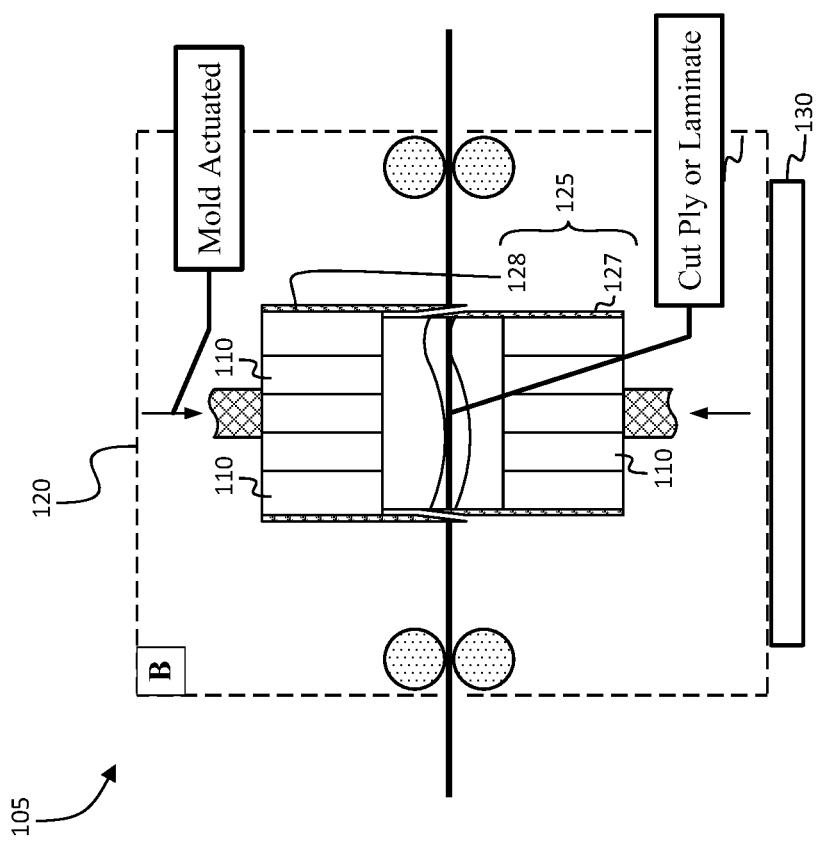
FIG. 3B is a schematic diagram of a second phase of a stamping and molding method, according to an embodiment of the present invention.

After the prepreg is drawn over the lower mold 115, one or both halves of the shear-mold assembly move in a direction perpendicular to the thickness direction of the prepreg so that the shear-mold assembly closes. As the shear-mold assembly moves, the shear blades 127, 128 cut the edges of the prepreg into the shape defined by the shear blades 127, 128 (FIG. 3B). In other embodiments, cutting of the prepreg is accomplished with an alternative device (e.g. a laser). While the ply is being cut, advancement of the material from either the prepreg roll or the consolidation stations may be halted. The line may be stopped to allow for compaction and curing of the ply, at which point advancement may resume.

Figure 3C:
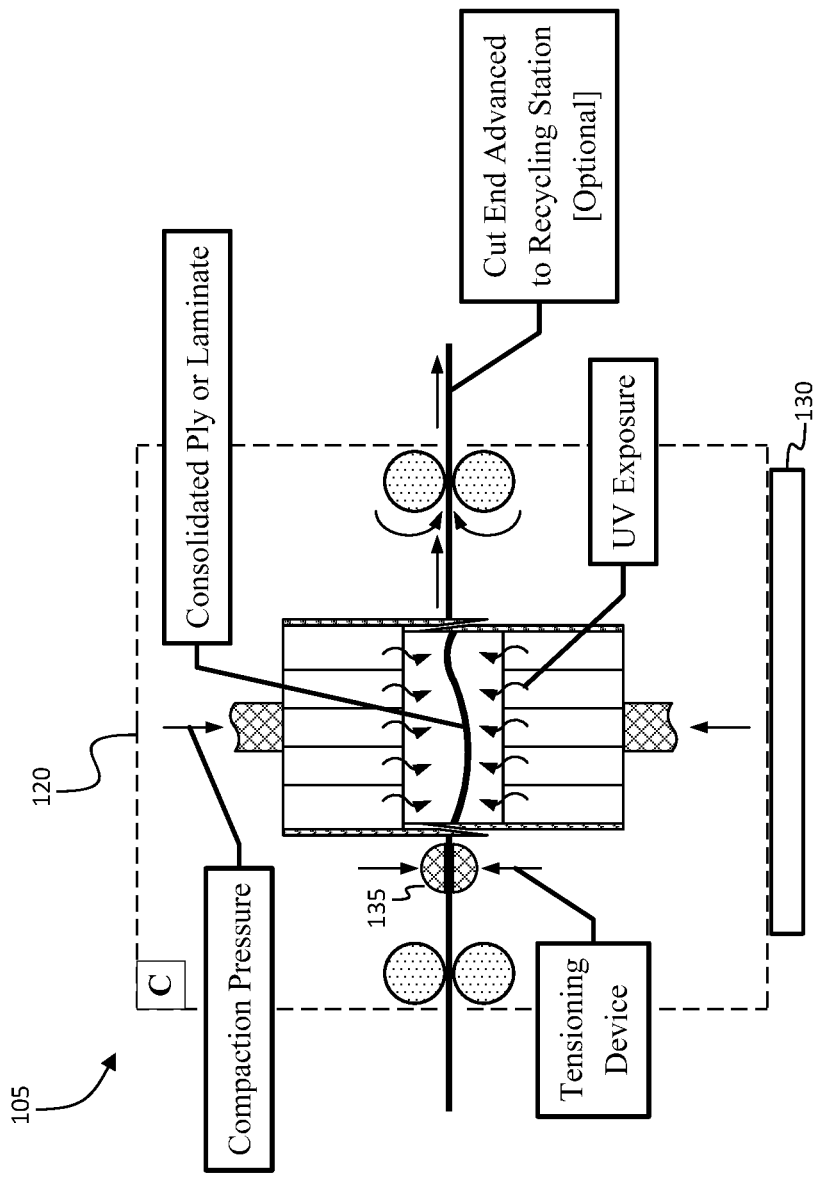
FIG. 3C is a schematic diagram of a third phase of a stamping and molding method, according to an embodiment of the present invention.
Figure 4:
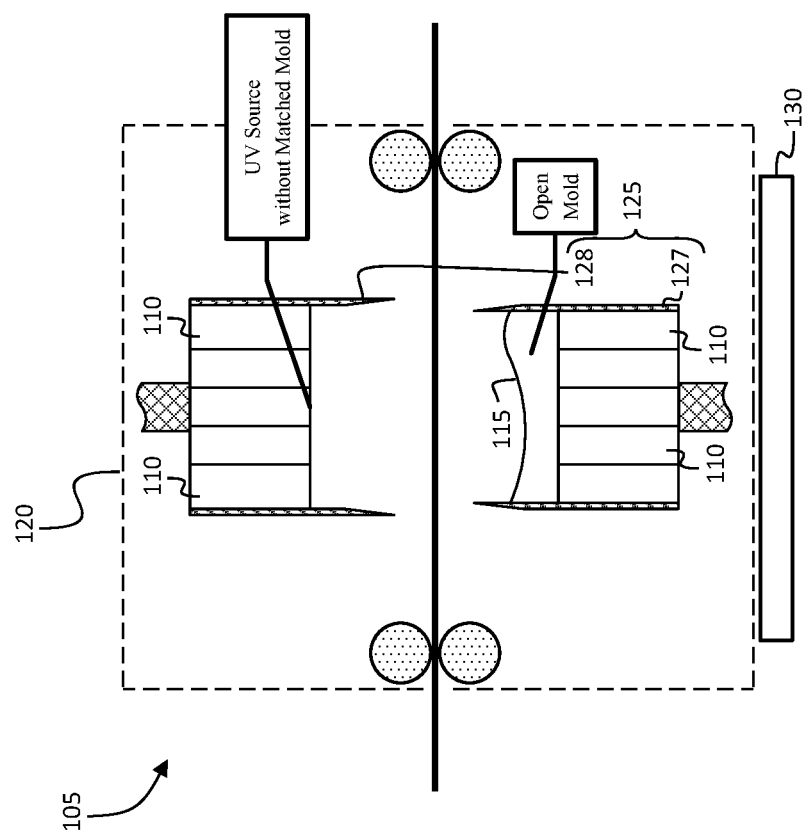
FIG. 4 is a schematic diagram of a stamping and molding station, according to an embodiment of the present invention.
Figure 5:
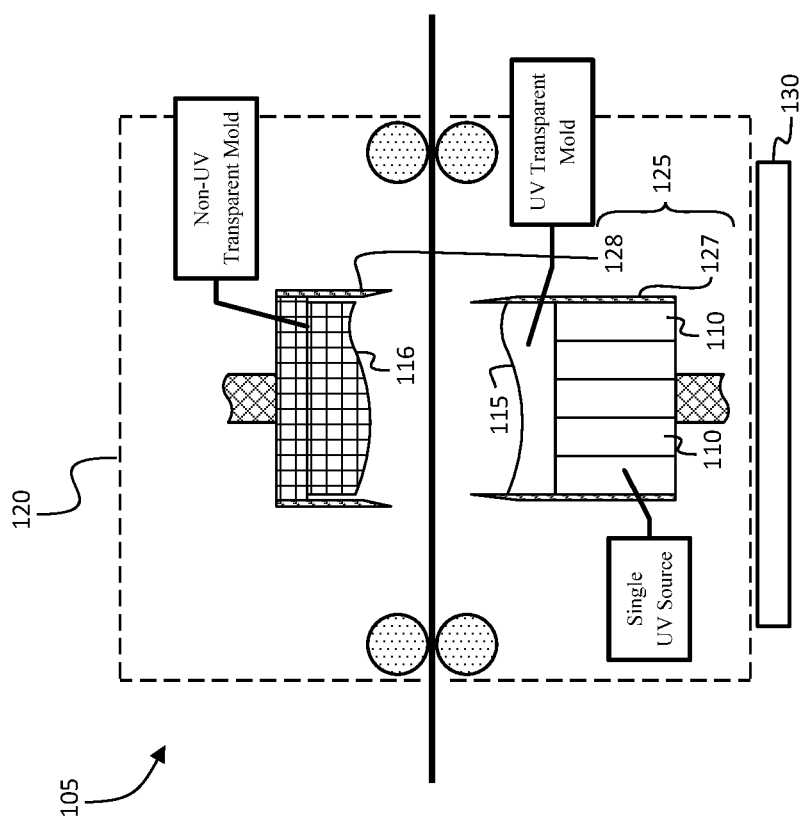
FIG. 5 is a schematic diagram of a stamping and molding station, according to an embodiment of the present invention.

In one embodiment, once the ply is cut from the prepreg, the clamping system grips the unsupported edge or edges of the prepreg, and the molds 115, 116 then move together to compress the ply and conform it into the desired shape (FIG. 3C). A closed mold assembly may be used in which lower and upper molds 115, 116 of the mold assembly define the shape of the part (e.g., male and female halves). In one such embodiment, the lower mold remains stationary, in a position in which the lower blade 127 is just below the sheet of prepreg, and the upper blade 128 and upper mold 116 move downwards as the mold assembly is closed. Alternatively, an open mold assembly design may be used in which the part is drawn over a single (male or female) mold without the assistance of a second mold (FIG. 4). In a further extension of the open mold assembly design, a flexible membrane may be drawn over the open section of the mold and evacuated (i.e. vacuum may be drawn) to conform the flexible membrane to the surface of the part under atmospheric pressure. Once the ply is fixed on the molding surface it may then be exposed to UV light (e.g., to light with a wavelength between 100 nm and 430 nm) through the transparent (e.g., UV-transparent) mold or molds, to which one or more UV sources are affixed. In another embodiment, one or more UV sources are used on only one of the lower and upper molds 115, 116 and the other may not be transparent (FIG. 5). As the ply is exposed to UV light, downstream portion of the sheet of prepreg may be moved to the recycling station (if the shear has severed it from the incoming sheet of prepreg).

Figure 3D:
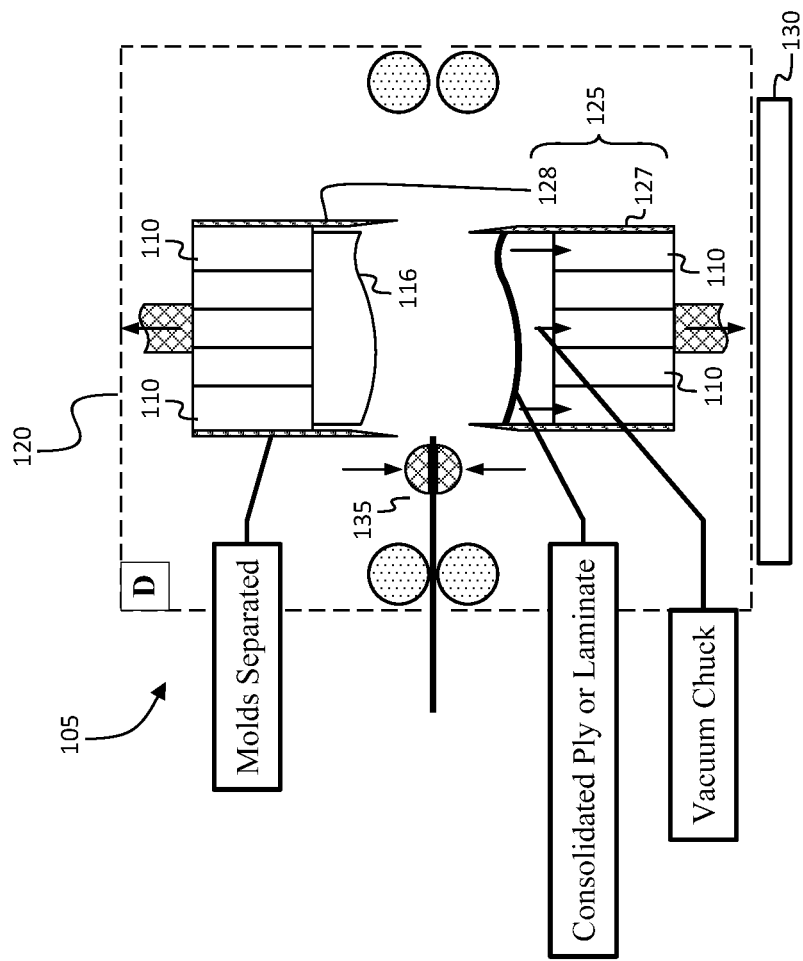
FIG. 3D is a schematic diagram of a fourth phase of a stamping and molding method, according to an embodiment of the present invention.

Exposure of the part to UV light may last for 15-180 seconds, at which point power to the sources is discontinued and the molds are separated (FIG. 3D). Upon separation (i.e., opening) of the mold assembly, if another ply is to be added to the part, vacuum may be applied via a chuck located within one of the molds to keep the part affixed to the surface of the mold before application of the next composite ply. The location of the vacuum chuck (e.g., whether it is in the upper mold 116 or lower mold 115) may define the build direction of the composite if it is cured in a ply-by-ply fashion.

Figure 3E:
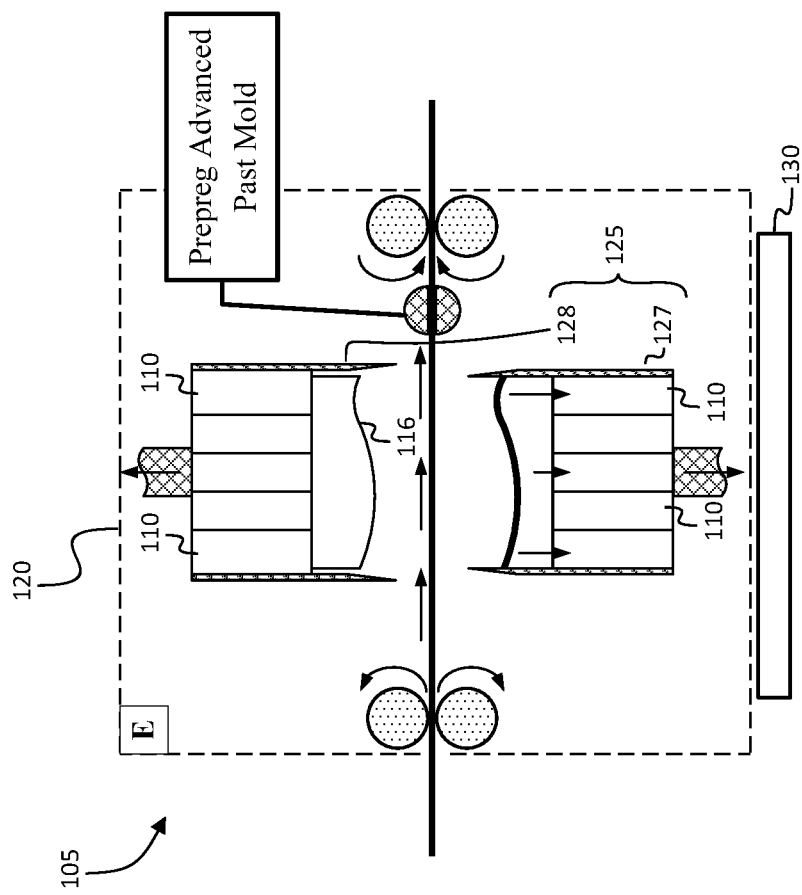
FIG. 3E is a schematic diagram of a fifth phase of a stamping and molding method, according to an embodiment of the present invention.

Once the molds are separated, prepreg is again advanced, i.e., fed into the stamping and molding station either from a roll of raw material or from the consolidation station. The tensioning device, which clamped the cut end of the prepreg in place during the molding operation, now advances the cut end to the next set of tensioning rollers (FIG. 3E).

Figure 3F:
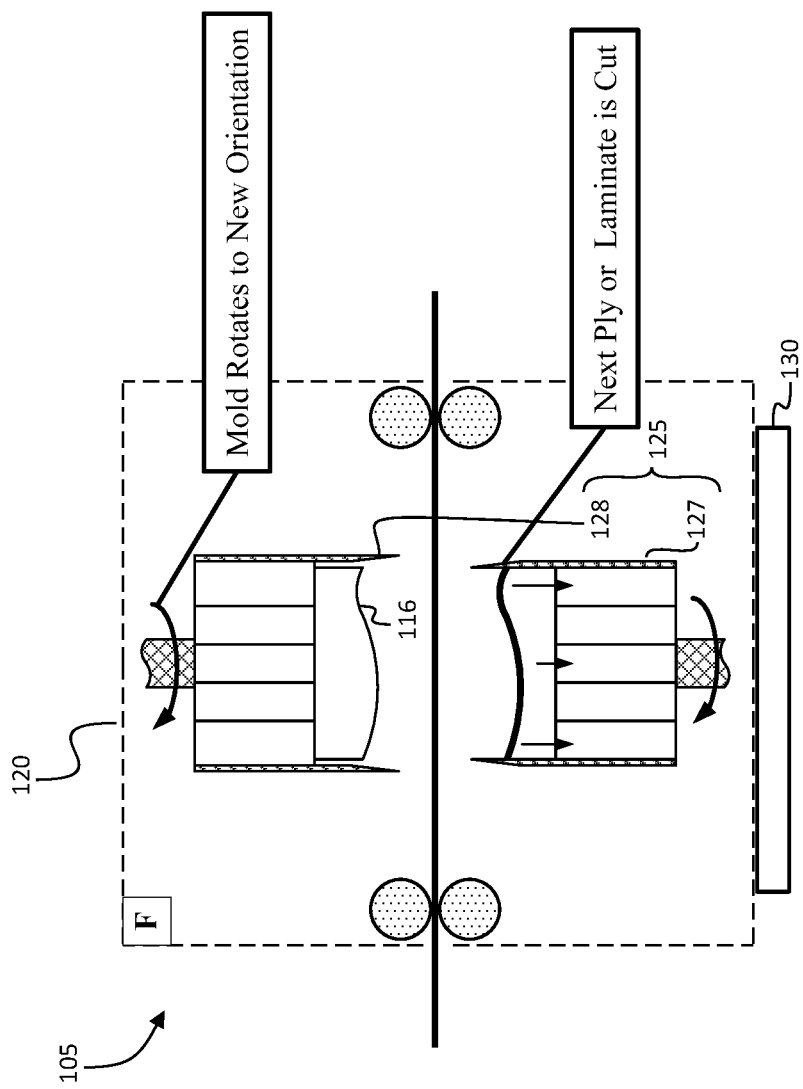
FIG. 3F is a schematic diagram of a sixth phase of a stamping and molding method, according to an embodiment of the present invention.

After the prepreg is advanced over the mold, the stamping and molding process is repeated until the total number of plies in the composite layup is attained (e.g., between 6 and 25 plies). To define the orientation of the plies within the composite layup, the mold assembly and the ply cutting device may be able to rotate (e.g., on the rotating mold base 130) with respect to the incoming prepreg material as shown in FIG. 3F. This allows for control over the fiber orientation in different plies in the composite layup. In one embodiment, the UV sources remain fixed and do not rotate with the molds 115, 116; in another embodiment, the UV sources are secured to the molds 115, 116 and rotate with them. In addition to this rotation, translation of the mold assembly with respect to the incoming prepreg material is also possible. Such translation may be used when the characteristic dimensions of the largest ply in the layup exceed the width of the composite prepreg (e.g., between 12" and 52"). Once all plies in the composite layup have been consolidated, the vacuum chuck is disengaged and the part is removed from the mold by a series of ejector pins 140 (FIG. 3A). A mold release agent may be applied to the mold or molds before the beginning of the molding operation, to facilitate removal of the part. In one embodiment, when the mold assembly is opened (e.g., by hydraulic actuators under the control of a processor unit), the molds move apart slowly at first, to reduce the risk of damaging the part, and, once the part is no longer attached to either mold (e.g., it has been pushed clear of the molding surfaces by ejector pins), the molds may move more quickly, to avoid wasting cycle time.

Figure 6:
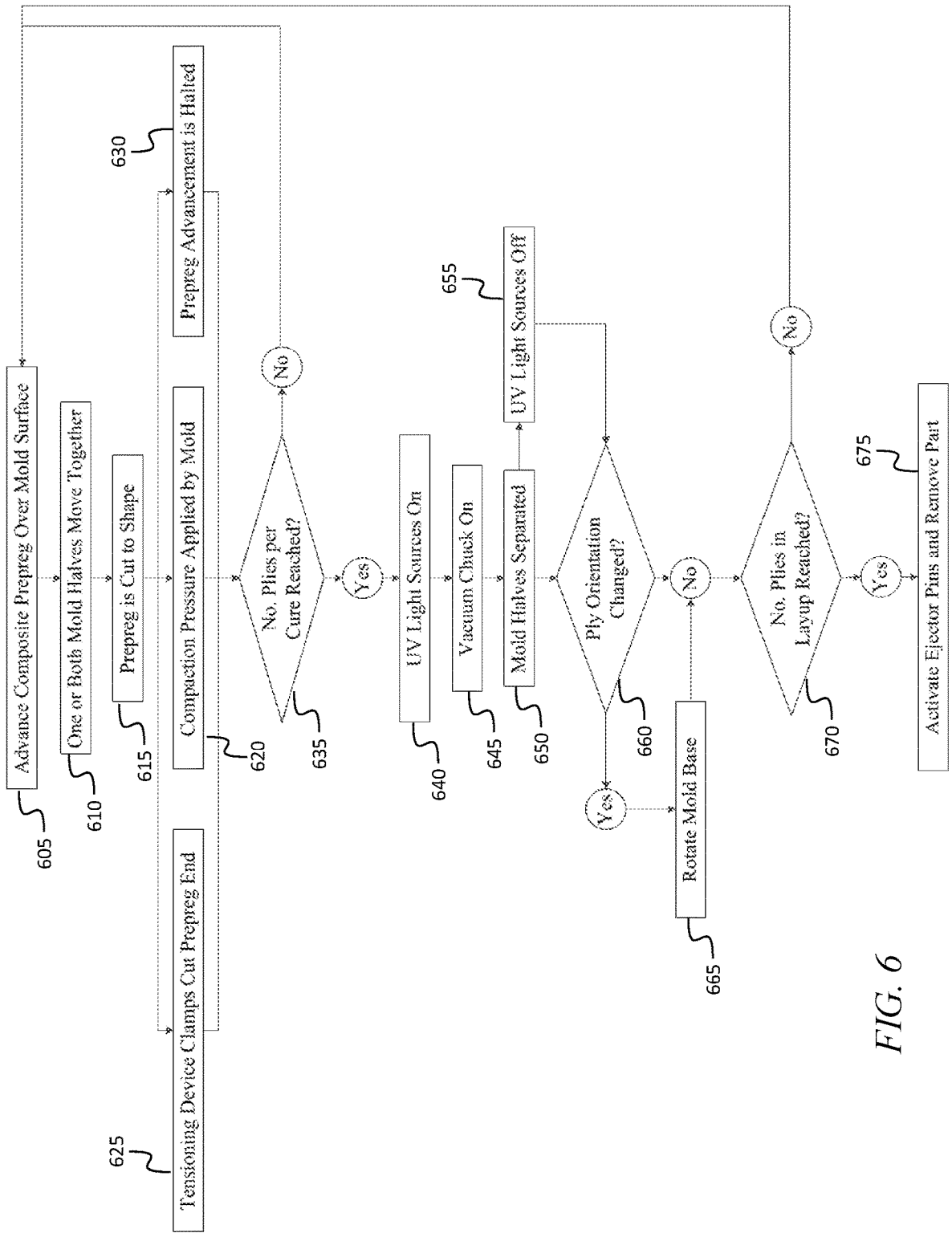
FIG. 6 is a flow chart of a method of stamping and molding, according to an embodiment of the present invention.

FIG. 6 is a flowchart for a method for operating the stamping and molding station 105. In some embodiments, several plies are cut and affixed to the mold (one at a time) and then the several plies are all cured at once to form a "sublaminate" including (e.g., consisting of) of several plies. In another embodiment, the entire part is cured in one exposure (a "full-part" cure). The choice of ply-by-ply, sublaminate or full-part cure may be selected based on the penetration depth of the UV light source into the composite layup. For shallow depths of cure (e.g., if the prepreg consists of a free radical cured matrix and non-UV transparent fibers) the ply-by-ply approach may be used (i.e., one ply may be cured at a time). When a part is formed in a plurality of UV exposures (with the addition of one or more plies before each UV exposures), the UV exposures may be selected to be sufficiently small that the most recent ply or plies added are not fully cured, but left tacky, for better adhesion to the next ply to be added. The UV exposures may also be selected so that the cumulative exposure of each ply is sufficient for a full cure. The final UV exposure may be longer than any of the preceding UV exposures. In some embodiments in which the depth of cure is sufficiently deep (e.g., when using cationic cured matrix and UV-transparent fibers), a full-part cure may be performed in a single exposure. As shown in FIG. 6, in one embodiment, in an act 605, the prepreg is advanced into the mold assembly or over the molding surface of a mold, in an act 610, one or both molds (or "mold halves" 115, 116 move, to bring the molds 115, 116 together, and in an act 615, the prepreg is cut to shape by the shear 125. In an act 620, compaction pressure is applied to the ply in the mold assembly (or to the several plies, if there are several in the mold assembly), while concurrently or simultaneously, in an act 625, the clamp 135 or "tensioning device" clamps the end of the prepreg and in an act 630, the prepreg advancement is halted. In an act 635, it is determined (e.g., by a processor unit) whether the number of plies in each cure operation (e.g. one in a ply-by-ply cure) has been reached; if the answer is no, the method returns to act 605, and if the answer is yes, the method continues on to act 640. In act 640, the UV light source or sources are turned on, in an act 645, the vacuum chuck is turned on, and in an act 650, the molds 115, 116 are separated. Optionally, in an act optional act 655, the UV light source or sources are turned off (in some embodiments they remain energized, as the exposure the ply experiences while being positioned over the mold and cut may not be sufficient to cause it to become rigid). In an act 660, it is determined (e.g., by a processor unit) whether the ply orientation is to be changed; if the answer is yes, then in an act 665, the rotating mold base 130 is rotated; otherwise this act is omitted. In an act 670, it is determined (e.g., by a processor unit) whether the number of plies in the part to be fabricated (i.e., in the "layup") has been reached; if the answer is no, then the method returns to act 605, and if the answer is yes, the ejector pins 140 are activated and the completed part is removed.

Figure 7:
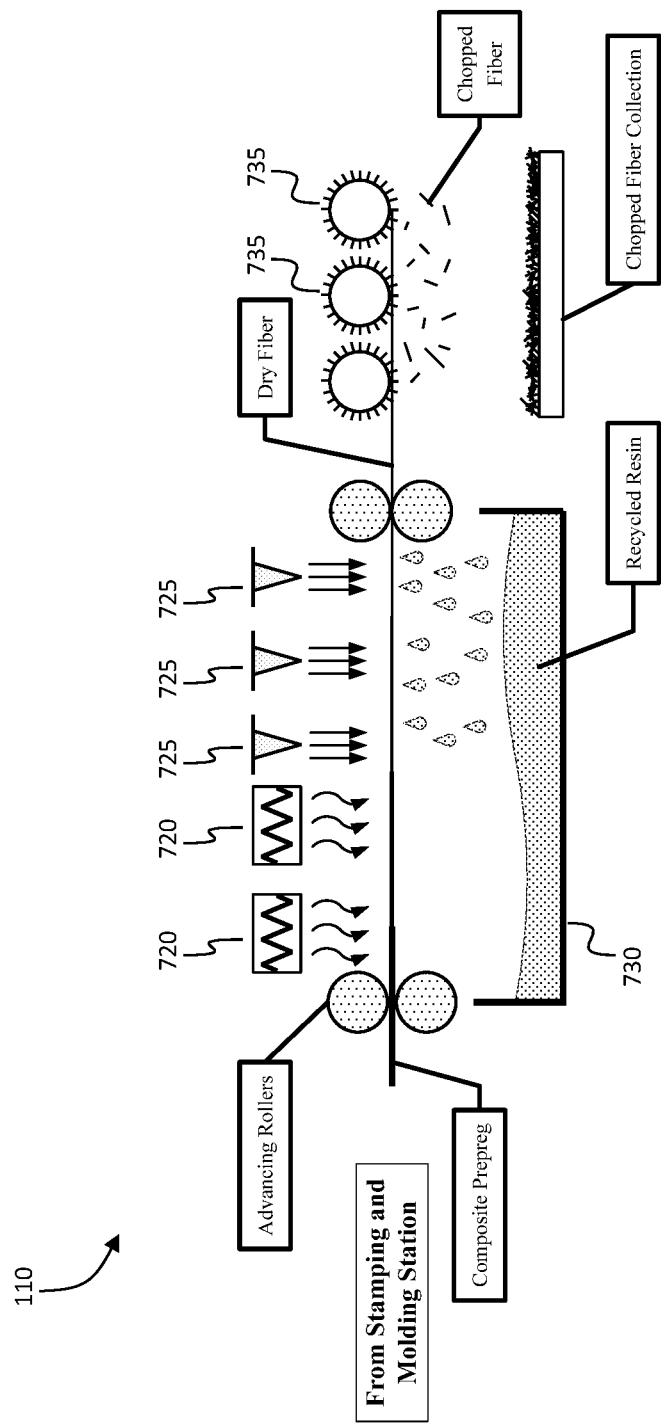
FIG. 7 is a schematic diagram of a recycling station, according to an embodiment of the present invention.

Referring to FIG. 7, in one embodiment raw prepreg material which is not consumed in fabrication of the part is subsequently recycled, in a recycling station 110 immediately following the stamping and molding station 105. The recycling station 110 serves to separate the constituent materials (resin and fiber) from prepreg which is not consolidated into a part. The recycling station 110 operates by taking cut material from the advancing roller in the stamping and molding station and passing it through a plurality of heating elements (e.g. IR heaters, resistive heaters, etc.) 720 and forced air extractors 725 to remove the resin from the prepreg while it is under tension. In some embodiments, the resin system is UV-cured and does not contain a thermal initiator, such that the heating elements serve only to reduce the viscosity of the resin and do not advance the cure of the material. The temperature at which the resin loses viscosity without beginning to cure may depend on the kind of resin used; in one embodiment it is between 60° C. and 120° C. After the material is heated, forced air extractors separate the fiber reinforcement from liquid resin which is then captured in a recycled resin containment vessel 730 below the line. In addition to the forced air elements and heaters, solvents (e.g. acetone, isopropyl alcohol, and/or toluene) may also be used to separate the polymer resin from the fibers. The dry fibers remain under tension and are subsequently collected for later use. The continuous length of the fiber may be interrupted by stamping of the composite plies, and recycling of the dry fiber reinforcement uses a chopping device such as fiber chopping wheels 735 to reduce the fibers to a common length (typically between 2-75 mm length) for later use. Collection of the chopped fibers may be accomplished using forced air, full or partial vacuum, electrically charged plates, or with natural convection or gravity. One or more components of the recycling station may be absent from the device. For example, the recycling station 110 may be composed of only the resin recycling components (e.g., tensioning rollers, forced air devices, heating elements, etc.), with fiber reinforcement not collected for later re-use. In other embodiments, the recycling station 110 is absent entirely.

Two additional stations, an impregnation station 810 and a consolidation station 910 (FIG. 9) may be added in-line and immediately preceding the stamping and molding station 105 to enable its use with raw constituent materials (i.e. initially separate fiber reinforcement and resin). In other embodiments, the stamping and molding station 105 is configured to operate with rolls of prepreg material as in FIG. 1 or FIG. 2. In an embodiment with an impregnation station 810 and a consolidation station 910, input to the system is in the form of dry (i.e. non-impregnated) continuous or discontinuous unidirectional, woven, braided, chopped mat or knit fibers and solid or liquid thermosetting polymer resin which is initially separate from the fiber reinforcement. The impregnation station 810 and the consolidation station 910 preceding the stamping and molding station 105 serve to combine the reinforcing fiber and resin phases into a pre-impregnated composite material which is then consolidated into a finished part by the stamping and molding station.

Figure 8:
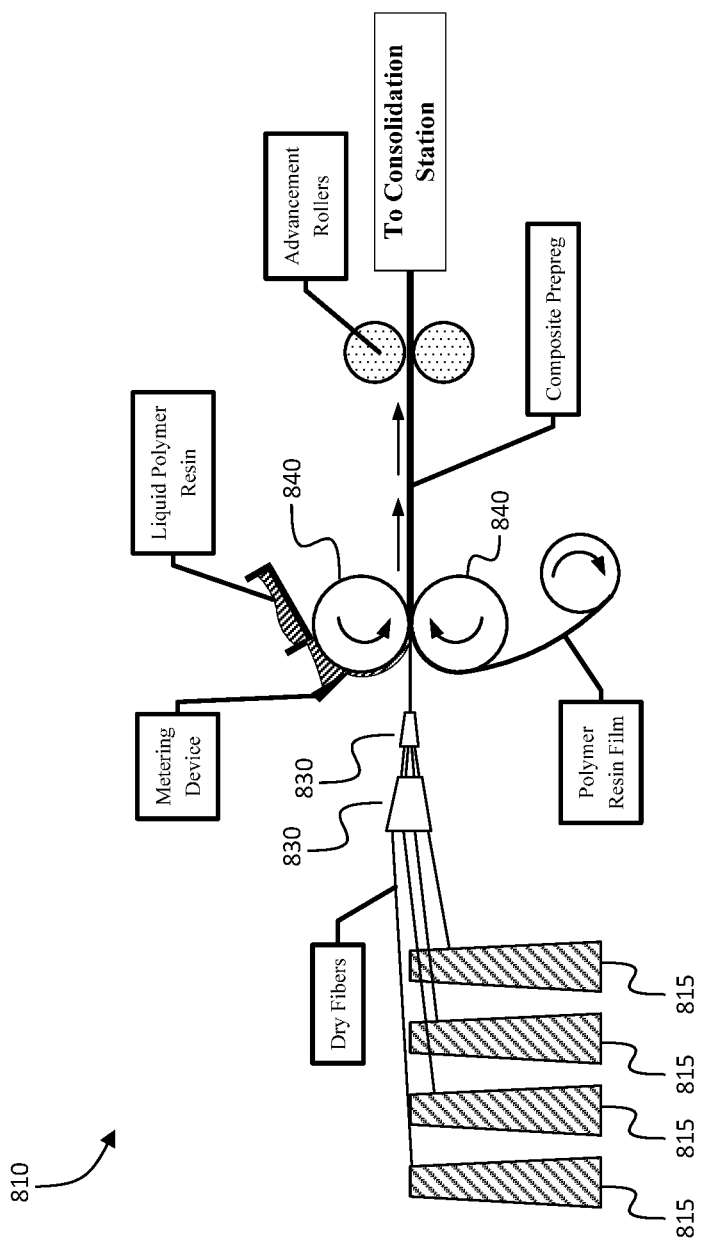
FIG. 8 is a schematic diagram of an impregnation station, according to an embodiment of the present invention.

A schematic of the impregnation station 810 is shown in FIG. 8. Fiber reinforcement is brought into the impregnation station 810 either as continuous unidirectional reinforcement from a series of spools or creels 815 or as a woven, knit, braided or discontinuous mat fabric composed of multiple fibers. If discontinuous mat fabric is used, the impregnation station 810 may add a binder to the discontinuous chopped mat to hold the mat together under tension. If continuous unidirectional reinforcement is used, the fibers are drawn from the spools or creels 815 and located with respect to a pair of compaction rollers, by fiber alignment elements 830 using a plurality of alignment pins or a steering guide. The dry fibers are impregnated with polymer resin using the impregnation rollers 840. In the one embodiment, the polymer resin is a UV-curable photopolymer in liquid form which is applied to the impregnation rollers 840 using a doctor blade or equivalent metering device 850. In other embodiments, the resin may have an alternative cure method (e.g. thermal, E-beam) or morphology (e.g. film or solid resin which is liquefied by a heating element). The impregnation system (including the impregnation rollers and a system for providing resin) serves to push resin into and through the reinforcing fibers so that the resin penetrates the fiber system (e.g., the woven fiber or fiber mat), thoroughly wetting the fibers. FIG. 8 illustrates the application of polymer resin in both liquid and film form; in some embodiments only liquid polymer resin is used; in other embodiments only polymer resin on a film is used. After passing through the compaction rollers 840, the impregnated resin/fiber system passes to the consolidation station 910.

Figure 9:
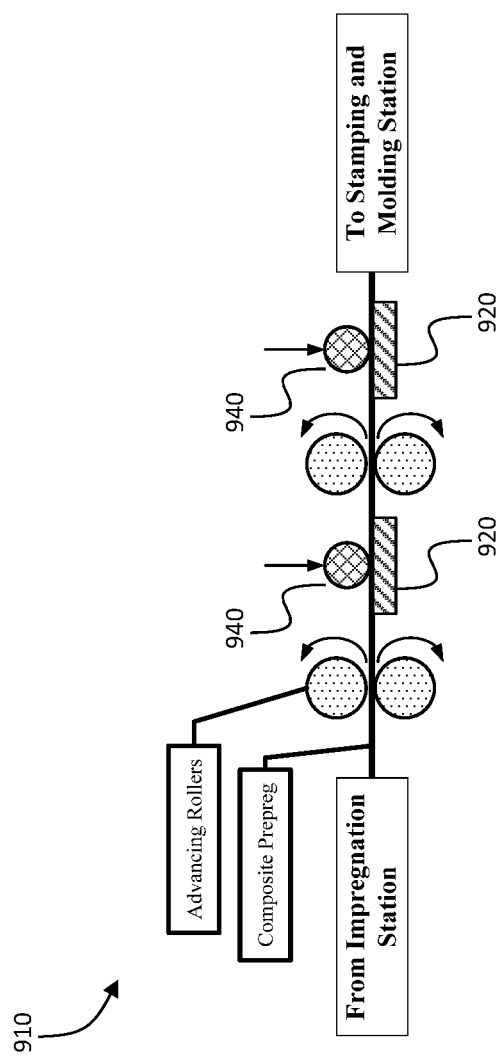
FIG. 9 is a schematic diagram of a consolidation station, according to an embodiment of the present invention.

The consolidation station 910 is illustrated in FIG. 9. It serves to control the temperature, viscosity, thickness, and tack of the impregnated resin/fiber system. In one embodiment, this station includes (e.g., consists of) a plurality of compaction rollers 940 and heating plates 920. The rollers are configured to maintain tension on the fiber/matrix system and to control the thickness of the material as it passes through the consolidation station 910. Additionally, one or more heating plates are located between the rollers, or opposite certain rollers (as shown) to control the temperature of the resin system. In one embodiment, the resin system is a UV-curable thermosetting polymer without a thermal initiator and thus the applied temperature serves only to control the viscosity of the resin and does not advance the cure of the material. In other embodiments, the resin system is fully or partially composed of thermally cured polymer and/or a UV-curable polymer containing a thermal initiator. In this embodiment, temperature applied via the heating plates controls the degree of cure or tack of the resin system (e.g. a B-stage epoxy system). In the consolidation station 910, the number of compaction rollers and heating plates is chosen such that the resin/fiber system reaches the correct temperature, viscosity and thickness by the time it reaches the stamping and molding station. A consolidation station 910 may have between 2 and 4 sets of compaction rollers and 2 or 3 hot plates.

Figure 10:
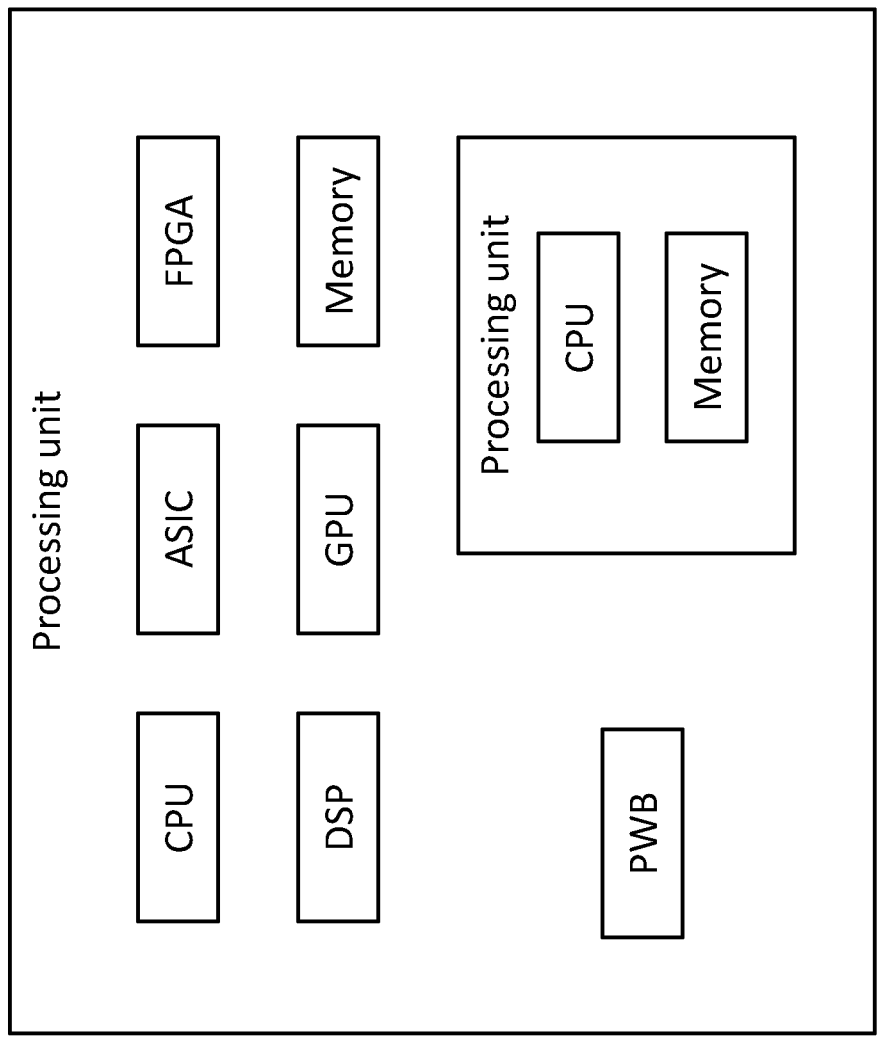
FIG. 10 is a block diagram of a processor unit, according to an embodiment of the present invention.

Referring to FIG. 10, in some embodiments, methods disclosed herein (e.g., the method illustrated in FIG. 6) are executed under the control of a processor unit. The term "processor unit" is used herein to include any combination of hardware, firmware, and software, employed to process data or digital signals. Processor unit hardware may include, for example, application specific integrated circuits (ASICs), general purpose or special purpose central processing units (CPUs), digital signal processors (DSPs), graphics processing units (GPUs), memory, and programmable logic devices such as field programmable gate arrays (FPGAs). In a processor unit, as used herein, each function is performed either by hardware configured, i.e., hard-wired, to perform that function, or by more general purpose hardware, such as a CPU, configured to execute instructions stored in a non-transitory storage medium. A processor unit may be fabricated on a single printed wiring board (PWB) or distributed over several interconnected PWBs. A processor unit may contain other processor units; for example a processor unit may include two processor units, an FPGA and a CPU, interconnected on a PWB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" means a component constituting at least half, by weight, of a composition, and the term "major portion", when applied to a plurality of items, means at least half of the items.

As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present invention". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a device for in-line consolidation of composite materials have been specifically described and illustrated herein, many modifications and variations will be apparent to those skilled in the art. Accordingly, it is to be understood that a device for in-line consolidation of composite materials constructed according to principles of this invention may be embodied other than as specifically described herein. The invention is also defined in the following claims, and equivalents thereof.

What is claimed is:

1. A method for fabricating a composite part, the method comprising:
   positioning a sheet of pre-impregnated thermosetting polymer matrix composite material (prepreg) for molding by a mold by advancing the sheet of prepreg by a plurality of rollers;
   cutting a piece of prepreg from the sheet, the cutting being performed while the sheet of prepreg is over the mold; and
   applying pressure to the piece of prepreg, the pressure being sufficient to cause the piece of prepreg to conform to a surface of the mold,
   wherein the rollers are further configured to maintain tension on the sheet of prepreg during the cutting the piece of prepreg from the sheet.

2. The method of claim 1, wherein the mold comprises a first mold having a molding surface and a second mold configured to mate with the first mold,
   wherein the cutting the piece of prepreg comprises advancing the first mold and the second mold toward each other, and
   wherein the applying pressure to the piece of prepreg comprises further advancing the first mold and the second mold toward each other.

3. The method of claim 2, wherein the cutting the piece of prepreg comprises cutting the sheet of prepreg at two areas.

4. The method of claim 2, wherein a cutting device for cutting the piece of prepreg is fixed to at least one of the first mold and the second mold.

5. The method of claim 2, further comprising:
   separating the first mold and the second mold after the applying pressure to the piece of prepreg;
   advancing the sheet of prepreg between the first mold and the second mold and over the piece of prepreg;
   cutting another piece of prepreg from the sheet by advancing the first mold and the second mold toward each other; and
   applying pressure to the piece of prepreg and the other piece of prepreg by further advancing the first mold and the second mold toward each other, the pressure being sufficient to cause the other piece of prepreg to conform to the surface of the mold and the piece of prepreg on the mold.

6. The method of claim 5, further comprising partially or fully curing the piece of prepreg and the other piece of prepreg after the applying pressure to the piece of prepreg and the other piece of prepreg.

7. The method of claim 5, further comprising activating a vacuum chuck to hold the piece of prepreg in place before the separating the first mold and the second mold.

8. The method of claim 5, further comprising:
partially or fully curing the piece of prepreg after the applying pressure to the piece of prepreg and before the cutting the other piece of prepreg from the sheet; and
partially or fully curing the other piece of prepreg after the applying pressure to the piece of prepreg and the other piece of prepreg.

9. The method of claim 8, wherein the partially or fully curing the piece of prepreg and/or the partially or fully curing the other piece of prepreg comprising using an ultraviolet light source.

10. The method of claim 9, wherein the ultraviolet light source is configured to emit light at a wavelength between 100 and 280 nm.

11. The method of claim 9, wherein the first mold is partially transparent to ultraviolet light or comprises an ultraviolet-transparent aperture.

12. The method of claim 5, further comprising rotating at least one of the first mold and the second mold before the applying pressure to the piece of prepreg and the other piece of prepreg.

13. The method of claim 1, wherein the prepreg comprises a matrix material and a reinforcing material.

14. The method of claim 13, wherein the matrix material comprises, as a major component, an ultraviolet-curable thermosetting polymer selected from the group consisting of thiols, -enes, acrylates, methacrylates, urethanes, epoxies, polyesters, vinyl esters, and combinations thereof.

15. The method of claim 13, wherein the matrix material comprises, as a major component, a thermally-curable thermosetting polymer matrix.

16. The method of claim 13, wherein the reinforcing material comprises, as a major component, fibers, comprising, as a major component, a material selected from the group consisting of carbon, aramid, glass, ultra-high molecular weight polyethylene, alumina, silicon carbide, boron and combinations thereof.

17. The method of claim 13, wherein the reinforcing material comprises, as a major component, continuous fibers, that are unidirectional, woven, braided or knitted.

18. The method of claim 13, wherein the reinforcing material comprises, as a major component, a discontinuous mat of fibers.

* * * * *